United States Patent
Tseng et al.

(10) Patent No.: US 7,974,868 B2
(45) Date of Patent: Jul. 5, 2011

(54) ENHANCING VIRALLY-MARKETED FACILITIES

(75) Inventors: Greg Tseng, Los Altos Hills, CA (US); Johann Schleier-Smith, Los Altos Hills, CA (US)

(73) Assignee: Tagged, Inc., San Francisco, CA (US)

( * ) Notice: Subject to any disclaimer, the term of this patent is extended or adjusted under 35 U.S.C. 154(b) by 1539 days.

(21) Appl. No.: 11/000,707

(22) Filed: Nov. 30, 2004

(65) Prior Publication Data
US 2005/0216338 A1 Sep. 29, 2005

Related U.S. Application Data

(60) Provisional application No. 60/552,406, filed on Mar. 10, 2004.

(51) Int. Cl.
G06F 17/30 (2006.01)
G07G 1/00 (2006.01)
(52) U.S. Cl. .................................................. 705/7.31
(58) Field of Classification Search ............... 705/10
See application file for complete search history.

(56) References Cited

U.S. PATENT DOCUMENTS

| | | | |
|---|---|---|---|
| 6,112,181 A | 8/2000 | Shear et al. | |
| 6,285,999 B1 | 9/2001 | Page | |
| 6,381,635 B1 * | 4/2002 | Hoyer et al. | 709/207 |
| 6,963,874 B2 * | 11/2005 | Kasriel et al. | 707/10 |
| 7,069,308 B2 | 6/2006 | Abrams | |
| 7,117,254 B2 | 10/2006 | Lunt et al. | |
| 7,149,977 B2 | 12/2006 | Zaner et al. | |
| 7,234,117 B2 | 6/2007 | Zaner et al. | |
| 7,249,123 B2 | 7/2007 | Elder et al. | |
| 7,269,590 B2 | 9/2007 | Hull et al. | |
| 7,359,894 B1 | 4/2008 | Liebman et al. | |
| 7,366,759 B2 | 4/2008 | Trevithick et al. | |
| 7,373,606 B2 | 5/2008 | Gorzela | |
| 7,433,876 B2 | 10/2008 | Spivack et al. | |
| 7,529,797 B2 | 5/2009 | Tseng et al. | |
| 7,756,926 B2 | 7/2010 | Tseng et al. | |
| 7,761,385 B2 | 7/2010 | Hutchison et al. | |
| 2001/0020231 A1 * | 9/2001 | Perri et al. | 705/14 |

(Continued)

FOREIGN PATENT DOCUMENTS

JP 2007328723 12/2007

(Continued)

OTHER PUBLICATIONS

Dunn, Dan T Jr; Probstein, Sidney C, Marketing high tech services, Review of Business v24n1 pp. 10, Winter 2003. Dialog file 15.*

(Continued)

*Primary Examiner* — Andre Boyce
(74) *Attorney, Agent, or Firm* — Perkins Coie LLP

(57) ABSTRACT

A method and apparatus for enhancing a virally marketed facility is described and illustrated. In one embodiment, the invention is a method of operating a virally marketed facility. The method includes measuring virality of the facility based on a conversion rate and a propagation rate. The method also includes determining potential options for increasing virality. The method further includes executing potential options for increasing virality. In an alternate embodiment, the invention is a method of operating a virally marketed facility. The method includes measuring virality of the facility. Also, the method includes determining potential options for increasing virality. Further, the method includes concurrently executing potential options for increasing virality.

31 Claims, 9 Drawing Sheets

U.S. PATENT DOCUMENTS

| | | | |
|---|---|---|---|
| 2002/0042733 A1* | 4/2002 | Lesandrini et al. | 705/10 |
| 2002/0103698 A1* | 8/2002 | Cantrell | 705/14 |
| 2003/0115333 A1* | 6/2003 | Cohen et al. | 709/227 |
| 2003/0208578 A1* | 11/2003 | Taraborelli et al. | 709/223 |
| 2005/0021750 A1 | 1/2005 | Abrams | |
| 2005/0160001 A1* | 7/2005 | Lapre et al. | 705/14 |
| 2005/0235062 A1 | 10/2005 | Lunt et al. | |
| 2006/0121990 A1 | 6/2006 | O'Kelley et al. | |
| 2006/0242554 A1 | 10/2006 | Gerace et al. | |
| 2006/0282328 A1 | 12/2006 | Gerace et al. | |
| 2007/0282877 A1 | 12/2007 | Fischer et al. | |
| 2008/0046458 A1 | 2/2008 | Tseng et al. | |
| 2008/0140650 A1 | 6/2008 | Stackpole | |
| 2009/0192861 A1 | 7/2009 | Suzuki et al. | |
| 2010/0088246 A1 | 4/2010 | Lim | |

FOREIGN PATENT DOCUMENTS

| | | |
|---|---|---|
| KR | 100643480 | 1/2006 |

OTHER PUBLICATIONS

Bannan, Karen J, It's catching, v41 n23 pp. IQ20-IQ26, Jun. 5, 2000. Dialog File 15.*

International Search Report PCT/US07/17051 Dated May 27, 2008; pp. 1-2.

U.S. Appl. No. 60/552,406, filed on Mar. 10, 2004.

U.S. Appl. No. 60/838,459, filed on Aug. 16, 2006.

U.S. Appl. No. 11/829,719, filed on Jul. 27, 2007, Issued Patent No. 7,529,797.

U.S. Appl. No. 12/422,155, filed on Apr. 10, 2009, Issued Patent No. 7,756,926.

U.S. Appl. No. 12/407,746, filed on Mar. 9, 2009.

Non-Final Office Action mailed May 21, 2008 for Issued Patent No. 7,529,797, U.S. Appl. No. 11/629,719, filed Jul. 27, 2007.

Final Office Action mailed Aug. 22, 2008 for Issued Patent No. 7,529,797, U.S. Appl. No. 11/629,719, filed Jul. 27, 2007.

Non-Final Office Action mailed Dec. 31, 2008 for Issued Patent No. 7,529,797, U.S. Appl. No. 11/829,719, filed Jul. 27, 2007.

Notice of Allowance mailed Mar. 6, 2009 for Issued Patent No. 7,529,797, U.S. Appl. No. 11/629,719, filed Jul. 27, 2007.

Notice of Allowance mailed Apr. 8, 2010 for Issued Patent No. 7,756,926, U.S. Appl. No. 12/422,155, filed Apr. 10, 2009.

Written Opinion PCT/US07/17051 dated May 27, 2008 pp. 1-5.

International Search Report PCT/US2010/025461 dated Sep. 28, 2010 pp. 1-3.

Written Opinion PCT/US2010/025461 dated Sep. 28, 2010 pp. 1-6.

Non-Final Office Action mailed Feb. 4, 20011 for U.S. Appl. No. 12/407,746, filed Mar. 19, 2009.

Restriction Requirement mailed Dec. 9, 2010 for U.S. Appl. No. 12/407,746, filed Mar. 19, 2009.

* cited by examiner

ENHANCING VIRALLY-MARKETED FACILITIES

CROSS-REFERENCE TO RELATED APPLICATION

The present application claims priority to U.S. Application No. 60/552,406, filed Mar. 10, 2004, which is incorporated herein by reference.

FIELD

The present invention generally relates to optimization of processes. The invention more specifically relates to utilizing viral marketing to enhance usage of a facility.

BACKGROUND

Websites and other facilities may be marketed in a variety of ways. One method of marketing is viral marketing, which uses electronic contacts such as chat rooms, emails and instant messages for example, or word of mouth and other avenues to effectively advertise the facility. Viral marketing has the potential to be inexpensive, as it may not require much of an advertising budget. Moreover, effective viral marketing may be swifter than any other marketing campaign available.

Measuring the impact of viral marketing can be difficult. The hallmark of a commercially viable website or other facility is a commercially self-sustaining business model. Based on relatively recent problems with various website-related businesses, determining early on what is a viable or self-sustaining business model can be helpful. Unfortunately, predicting the future is always inexact, and it can be woefully incorrect when applied to new forms of business, such as websites, or new methods of marketing, such as viral marketing.

While the ultimate measure of success is revenue which exceeds expenses by a desired margin, this cannot be instantly determined. Moreover, it may not be apparent until well after sunk costs are committed in an unrecoverable manner. Avoiding a large investment in an ultimately doomed enterprise is the goal of such prediction. Accordingly, it may be helpful to provide an early detection method for sustainability of a virally marketed facility. Moreover, it may be useful to measure parameters other than outright revenue to predict success. What parameters to measure, other than revenue or net profit, is not at all obvious. Similarly, how to use measured parameters to predict revenue or net profit, for example, may not be obvious.

Additionally, it may be useful to change a virally marketed facility prior to assuming the facility will not be profitable. Determining what to change and how to change it may be helpful in this regard. Moreover, determining how to implement changes may also be helpful.

SUMMARY

The present invention is described and illustrated in conjunction with systems, apparatuses and methods of varying scope. In addition to the aspects of the present invention described in this summary, further aspects of the invention will become apparent by reference to the drawings and by reading the detailed description that follows.

A method and apparatus for enhancing a virally marketed facility is provided. In one embodiment, the invention is a method of operating a website. The method includes measuring virality of the website. The method also includes determining potential options for increasing virality. The method further includes concurrently executing potential options for increasing virality.

In an alternate embodiment, the invention is an apparatus for operating a virally marketed facility. The apparatus includes a facility manager coupled to the facility. The apparatus further includes a metric measurement module coupled to the facility manager and to the facility. The apparatus also includes a variation tester coupled to the metric measurement module and the facility manager.

In another alternate embodiment, the invention is a method of operating a virally marketed facility. The method includes measuring virality of the facility based on a conversion rate and a propagation rate. The method also includes determining potential options for increasing virality. The method further includes executing potential options for increasing virality.

In still another alternate embodiment, the invention is a system for operating a virally marketed facility. The system includes a processor. Moreover, the system includes a memory coupled to the processor. Also, the system includes a user interface coupled to the processor. Further, within the system the processor is to measure virality of the facility. Moreover, within the system the processor is to determine potential options for increasing virality. Also, within the system the processor is to concurrently execute potential options for increasing virality.

In yet another alternate embodiment, the invention is a medium embodying instructions, which, when executed by a processor, cause the processor to perform a method. The method includes measuring virality of a website. The method also includes determining potential options for increasing virality. The method further includes concurrently executing potential options for increasing virality.

In still another alternate embodiment, the invention is a method of operating a virally marketed facility. The method includes measuring virality of the facility. Also, the method includes determining potential options for increasing virality. Further, the method includes concurrently executing potential options for increasing virality.

In yet another alternate embodiment, the invention is an apparatus for managing a virally marketed facility. The apparatus includes means for measuring virality of the facility. The apparatus also includes means for determining potential options for increasing virality. The apparatus further includes means for concurrently executing potential options for increasing virality.

In still another alternate embodiment, the invention is a method of operating a website. The method includes initiating the website based on an idea and measuring virality of the website. The method also includes identifying portions of the website for which options for increasing virality may be determined. The method further includes determining potential options for increasing virality. The method also includes concurrently executing potential options for increasing virality. Moreover, the method includes selecting options for increasing virality based on effectiveness. Additionally, the method includes repeating the measuring, identifying, determining, simultaneously executing, and selecting.

Embodiments of the invention presented are exemplary and illustrative in nature, rather than restrictive. The scope of the invention is determined by the appended claims.

BRIEF DESCRIPTION OF THE DRAWINGS

Embodiments of the invention are illustrated in the figures. However, the embodiments and figures are illustrative rather

DETAILED DESCRIPTION

Figure 1:
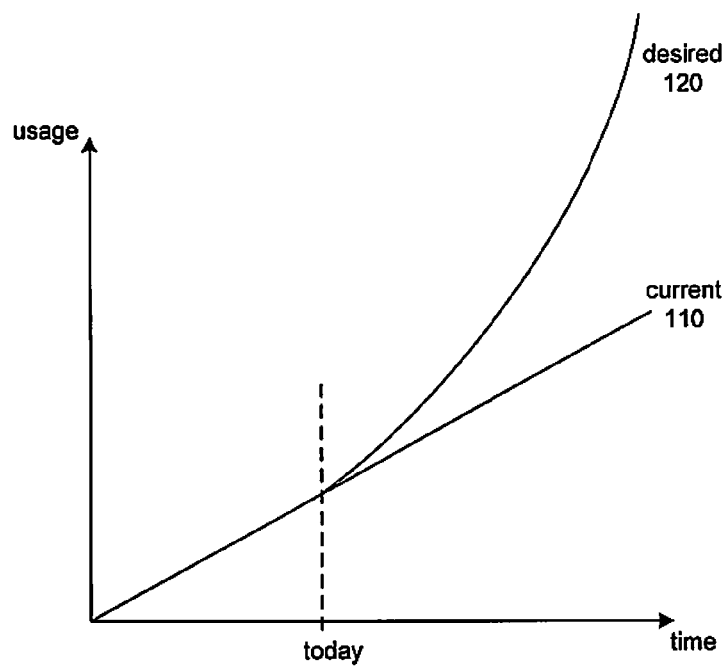
FIG. 1 illustrates a plot of usage against time.

The present invention is described and illustrated in conjunction with systems, apparatuses and methods of varying scope. In addition to the aspects of the present invention described in this summary, further aspects of the invention will become apparent by reference to the drawings and by reading the detailed description that follows.

The intuitive concept of viral growth in a consumer service product is that by interacting with the product in a natural way, each user brings more than one additional user to the product. A method and apparatus for enhancing virally marketed facilities is provided. In one embodiment, the invention may be understood as including tracking ratios of conversions and propagations, analyzing a virally marketed facility for potential improvements, testing the potential improvements concurrently, and using successful improvement going forward. This may be implemented as a method using automatic or manual operations, as an apparatus operating automatically or with user input, or as a system for example.

In one embodiment, the invention is a method of operating a website. The method includes measuring virality of the website. The method also includes determining potential options for increasing virality. The method further includes concurrently executing potential options for increasing virality.

In an alternate embodiment, the invention is an apparatus for operating a virally marketed facility. The apparatus includes a facility manager coupled to the facility. The apparatus further includes a metric measurement module coupled to the facility manager and to the facility. The apparatus also includes a variation tester coupled to the metric measurement module and the facility manager.

In another alternate embodiment, the invention is a method of operating a virally marketed facility. The method includes measuring virality of the facility based on a conversion rate and a propagation rate. The method also includes determining potential options for increasing virality. The method further includes executing potential options for increasing virality.

In still another alternate embodiment, the invention is a system for operating a virally marketed facility. The system includes a processor. Moreover, the system includes a memory coupled to the processor. Also, the system includes a user interface coupled to the processor. Further, within the system the processor is to measure virality of the facility. Moreover, within the system the processor is to determine potential options for increasing virality. Also, within the system the processor is to concurrently execute potential options for increasing virality.

In yet another alternate embodiment, the invention is a medium embodying instructions, which, when executed by a processor, cause the processor to perform a method. The method includes measuring virality of a website. The method also includes determining potential options for increasing virality. The method further includes concurrently executing potential options for increasing virality.

In still another alternate embodiment, the invention is a method of operating a virally marketed facility. The method includes measuring virality of the facility. Also, the method includes determining potential options for increasing virality. Further, the method includes concurrently executing potential options for increasing virality.

In yet another alternate embodiment, the invention is an apparatus for managing a virally marketed facility. The apparatus includes means for measuring virality of the facility. The apparatus also includes means for determining potential options for increasing virality. The apparatus further includes means for concurrently executing potential options for increasing virality.

In still another alternate embodiment, the invention is a method of operating a website. The method includes initiating the website based on an idea and measuring virality of the website. The method also includes identifying portions of the website for which options for increasing virality may be determined. The method further includes determining potential options for increasing virality. The method also includes concurrently executing potential options for increasing virality. Moreover, the method includes selecting options for increasing virality based on effectiveness. Additionally, the method includes repeating the measuring, identifying, determining, simultaneously executing, and selecting.

The invention, in various embodiments, may be illustrated with reference to methods, apparatuses, and plots of effects or usage of the virally marketed facilities. Virality and other terms associated with viral marketing may have various definitions. For example, virality may be defined as a scalar average number of children (resulting or referred members) from a parent (original or referring member). A virality vector may be similarly defined as the number of children from a parent over time, for example. Virality may also be defined as a the constant in an exponential model of growth in the virally marketed facility. Each of these definitions may be useful at times, and various circumstances may determine which definition to use.

Typically, behavior over time may be a useful attribute to examine. FIG. 1 illustrates a plot of usage against time. As illustrated, a current usage level and desired usage level are plotted. The plot illustrates that over time, usage of a website or other virally marketed facility may not meet requirements for feasibility or economic scale. In particular, current level plot 110 is a plot of actual usage over time, whereas desired level plot 120 is a plot of desired usage over time. As illustrated, part of the plot is backward looking, based on collected data, and part of the plot is forward-looking, based on projections and extrapolation.

Figure 2:
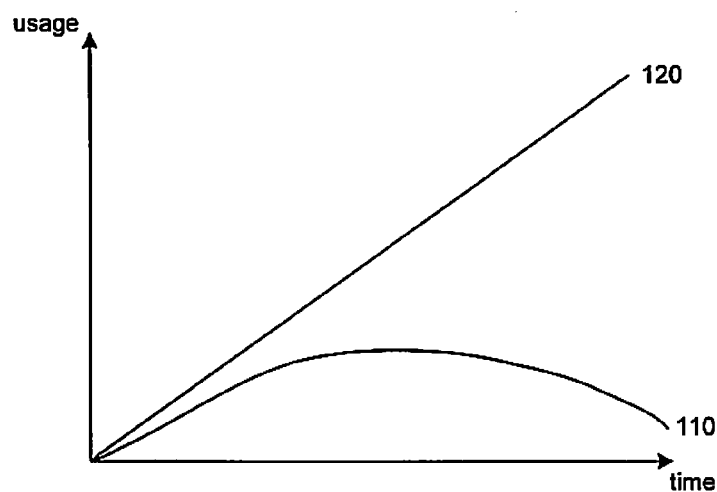
FIG. 2 illustrates an extended plot of usage against time.

Similarly, FIG. 2 illustrates an extended plot of usage against time. As illustrated, usage which is not meeting requirements early may indicate a trend in which usage will turn down and/or taper off at a level significantly below a desired or required usage level. Current level plot 110 drops in magnitude over time, whereas desired level plot 120 rises over time. In practical terms, this may indicate a website or other virally marketed facility is not economically self-supporting, let alone profitable, and thus does not represent a good commercial use of assets. The desired level plot 120 may not necessarily represent a requirement level or tipping point. Rather, a requirement level of usage may be represented as a flat level (absolute magnitude) of usage, or may be represented as a percentage of the desired level plot 120 for example.

Figure 3A:
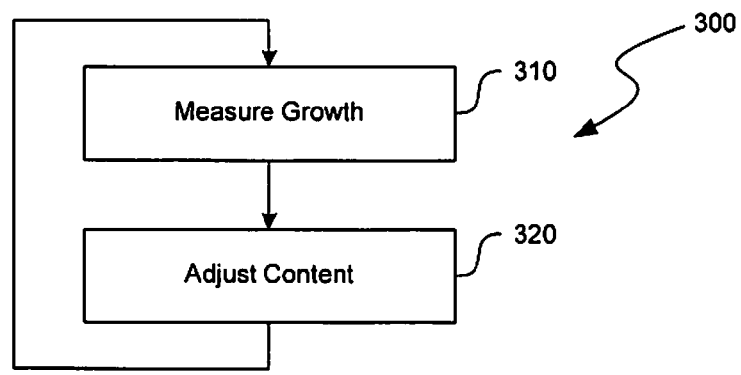
FIG. 3A illustrates an embodiment of a method of operating a process.

FIG. 3A illustrates an embodiment of a method of operating a process. To avoid lack of usage, a method may be used to operate a process or facility. Method 300 (and all methods of this document) includes modules which may be implemented in a variety of ways, such as steps in a process, process modules, system or apparatus modules, or some other form. At module 310, growth of a website is measured. At module 320, adjustments are made to content of the website. Presumably, the adjustments are intended to increase growth. The process then returns to module 310, thus providing a feedback loop and allowing for multiple adjustment cycles.

Figure 3B:
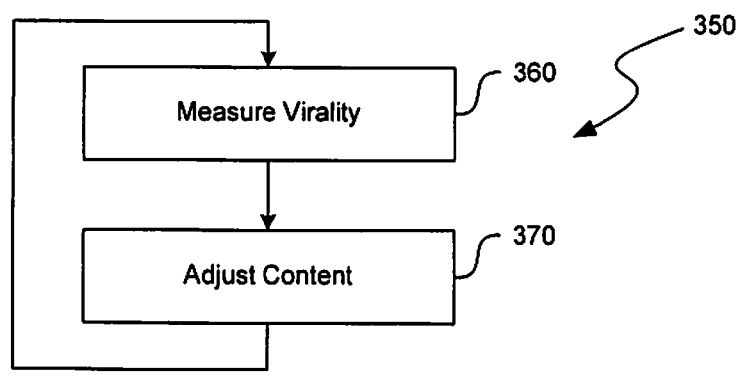
FIG. 3B illustrates another embodiment of a method of operating a process.

FIG. 3B illustrates another embodiment of a method of operating a process. To avoid the problems of lack of usage or to increase usage, a method may be used to operate a process or virally marketed facility. Method 350 includes modules as described above. At module 360, virality (or viral growth of some form for example) of a website is measured. At module 370, adjustments are made to content of the website. Presumably, the adjustments are intended to increase virality. The process then returns to module 360, thus providing a feedback loop and allowing for multiple adjustment cycles.

Figure 4:
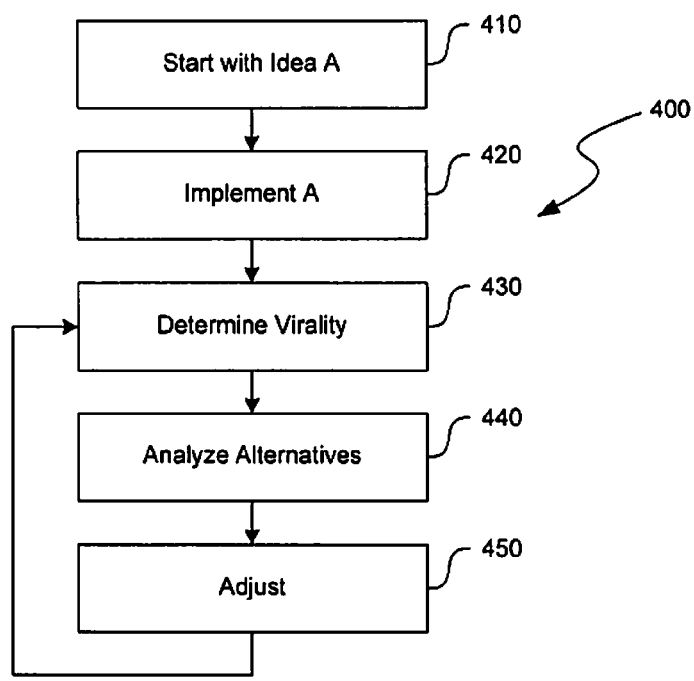
FIG. 4 illustrates an alternate embodiment of a method of operating a process.

The process of FIG. 3B may be understood as a variation on a larger process. FIG. 4 illustrates an alternate embodiment of a method of operating a process. The method 400 includes modules as described with respect to method 300. Method 400 includes implementing an idea as a website, determining whether the implementation grows virally, analyzing alternative options, and adjusting the website. Thus, method 400 may allow for improvements to a website allowing for increased virality.

Method 400 begins with module 410, in which an idea for a website is introduced or provided. At module 420, the idea is implemented as a website. At module 430, virality of the website is measured or otherwise determined. This determination may come in the form of measuring an increase in subscribers, monitoring commentators and chat rooms, or some other form of evaluating public discussion of the website.

If virality needs to be improved, at module 440 alternatives to the current implementation of the website are analyzed, such as different content. At module 450, adjustments are made to the website. The process then returns to module 430, allowing for a feedback process and multiple cycles of updating and measurement.

Figure 5:
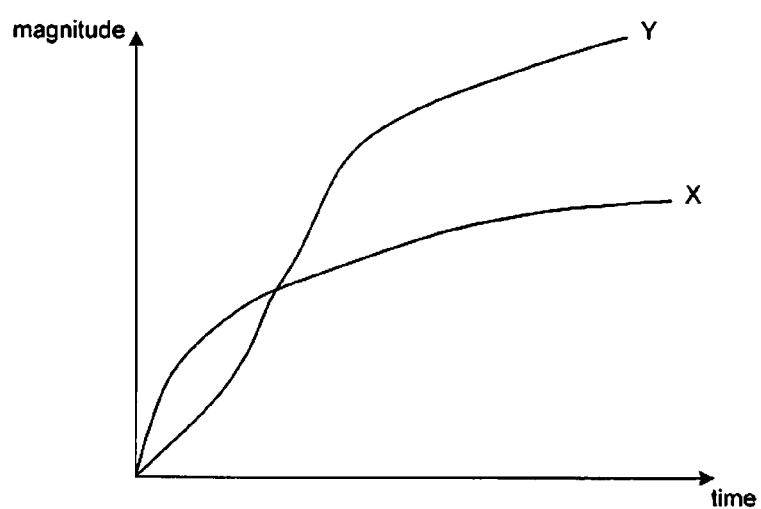
FIG. 5 illustrates another plot of usage against time.

Virality may be measured in a variety of ways. FIG. 5 illustrates another plot of usage against time. However, the curves of FIG. 5 illustrate plots of virality metrics rather than absolute usage. These virality metrics provide an indication of the expected usage trajectory of a website or other virally marketed facility. As illustrated, X is the conversion rate, which is a ratio of total signups in the future to the number of invitations sent in a day. This may also be calculated as the instantaneous or daily signups divided by the total invites sent to generate these signups. This ratio provides an indication of whether invitations are becoming registrations. It requires (in this embodiment) predictive interpretation of registrations, which may be done based on a combination of data from a given site and historical data aggregated from a variety of sites.

Similarly, as illustrated, Y is a propagation rate, which is the average number of invites sent by people who registered on a given day, as used in some embodiments. This may also be called the instantaneous or daily invites divided by the instantaneous or daily signups. Y may also be a ratio of cumulative invites from signups in a day divided by signups in a day in some embodiments. Other metrics for X and Y may be suitable in some situations, typically the measured parameters will provide an indication of whether customers are continuing to generate additional interest from others, and whether interest in the site is continuing to generate additional customers. In some embodiments, the two metrics or factors have some form of positive feedback or reinforcing relationship which provides an indication the facility will grow in usage. The possibility of negative feedback should also be considered.

As illustrated, the plots of X and Y indicate that the website will continue to grow in usage, thus potentially representing a viable commercial investment. When the product of X and Y at long times becomes less than 1 (decreases or falls below 1), this may indicate the site is no longer likely to grow, and thus is not worth additional resources. In other words, a tipping point may have been reached such that the site should no longer be supported. This type of metric may be applied to any virally marketed facility, such as a subscription based magazine, a consumer service outlet (such as a restaurant for example), or other facility depending largely on viral or word-of-mouth marketing. Moreover, keeping the values of the X and Y factors positive or greater than a certain level (ratios above 1 for example) may be the desired goal, with the expected effect that the site or facility will continue to grow. Success may be defined differently in different circumstances, such that continued growth may be sufficient in some instances, whereas growth above a certain level may be necessary in other instances.

A virally marketed facility is preferably a facility such as a website which has the property that using the product generates more customers. The ratios measure whether this property is present for a given facility. Tracking these variables and making sure they accelerate, increase, or maintain a desired relationship results in an indication that the facility is virally marketing, and should be profitable assuming solid fundamentals and no unreasonable external pressures (e.g. uninhibited cost growth). Also, in alternate embodiments, invites or registrations may be replaced with contacts, representing contacts with potential customers, as opposed to signups which imply a customer actually visiting the website.

Figure 6:
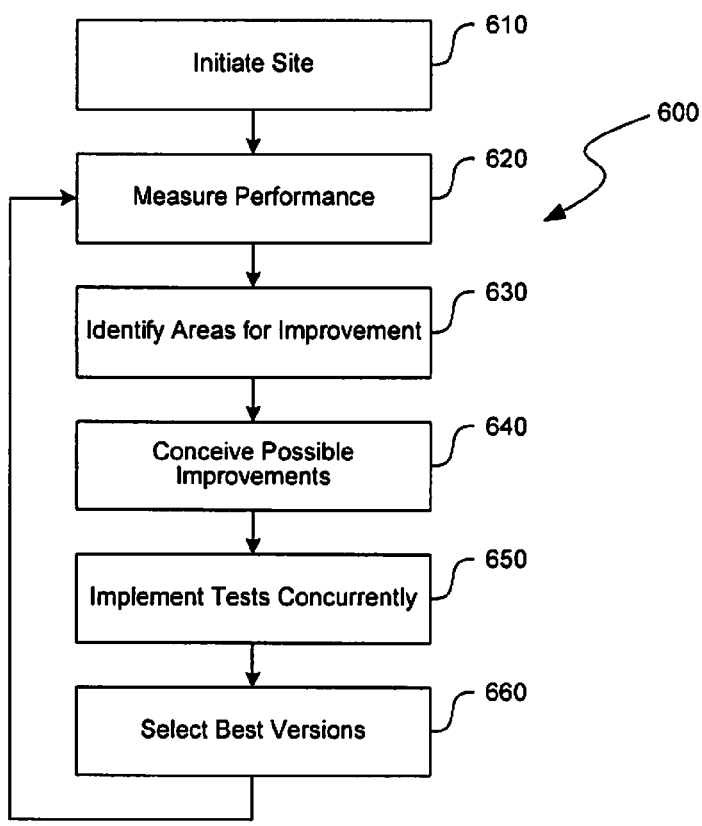
FIG. 6 illustrates another alternate embodiment of a method of operating a process.

Various methods may be employed in achieving this goal of increasing growth. FIG. 6 illustrates another alternate embodiment of a method of operating a process. Method 600 includes initiating a site, measuring performance such as through the metrics of FIG. 5, identifying areas and options for improvement, implementing test improvements concurrently, selecting best improvements, and repeating the process. Method 600 is composed of modules suitable for implementing the various portions of the method.

At module 610, the site (website or other virally marketed facility) is initiated. This may, for example, involve a launch including publicity and fanfare, or a spinoff of another site. At module 620, performance of the site is measured, such as through the metrics described with respect to FIG. 5. Performance measurements may relate to new user accesses, existing user usage, invitations to new users, or other measurements. Measurements may also relate to increasing revenue streams or renewal/cancellation of subscriptions, for example. At module 630, areas for potential improvement are identified. This may relate to site content, site structure, usability, accessibility, outreach (advertising and rewards programs for example), or other areas. At module 640, potential improvements are considered or created. This may relate to adding content or functionality, shifting portions of a site between a standard and a premium or VIP status, increasing marketing outreach, or other potential improvements for example.

At module 650, tests of potential improvements are implemented concurrently (preferably close to simultaneously) alongside a control version which is the previous implementation. In some embodiments, concurrent implementation involves implementation of different potential improvements for different, randomly selected users, during the same designated test period (such as the same 48 hour time for example). It has been shown empirically that implementation in parallel or concurrently tends to produce better results for a virally marketed facility. At module 660, best versions of the concurrently implemented tests are selected. This may be a result of identifiable changes in usage or subscriptions for example (such as use of an identifiable coupon or referral for example), or may be a result of inferences drawn from apparent improvements. For sites or facilities that appear to be worth supporting, the method then returns to module 620 for measurement of performance, and thus implements feedback.

Some flexibility in ordering of operations may be allowed for, such that measurement of performance may be partially incorporated into selecting best versions at module 660 for example. Similarly, performance may be measured or best versions may be selected in various different sets of circumstances or along with various modules. Moreover, best versions may allow for spinning off separate facilities or sites based on multiple improvements that either appear to be self-supporting or appear to be mutually incompatible. Portions of the method may be automated in various ways. For example, identification of areas for improvement and standard options for improvement may be automated, along with concurrent testing of these options for improvement. Similarly, evaluation of results may be automated along with selection of best versions. Thus, most of the modules (potentially all) may be automated for some virally marketed facilities such as electronic facilities (e.g. websites).

Figure 7:
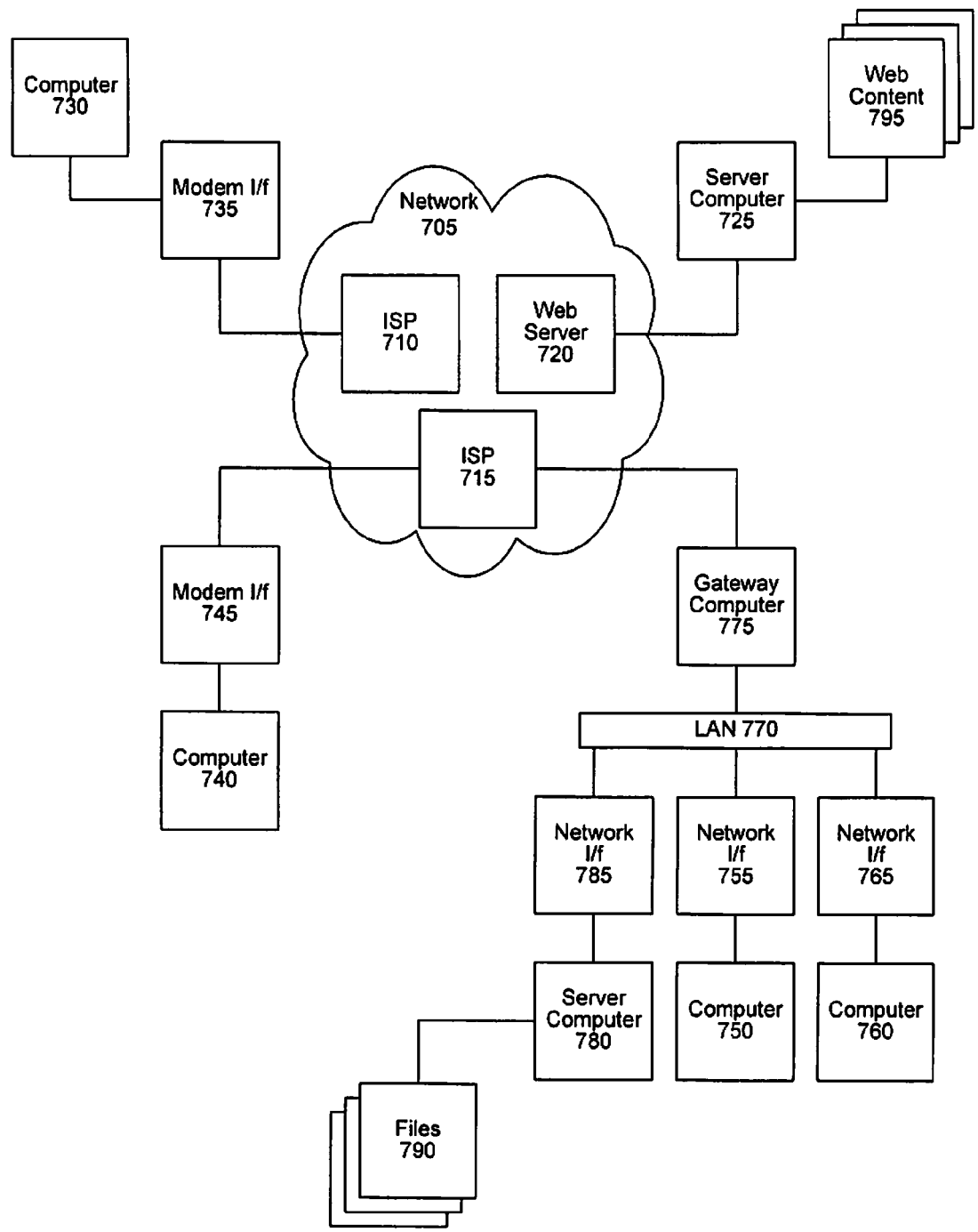
FIG. 7 illustrates an embodiment of a system which may be used with the methods described.
Figure 8:
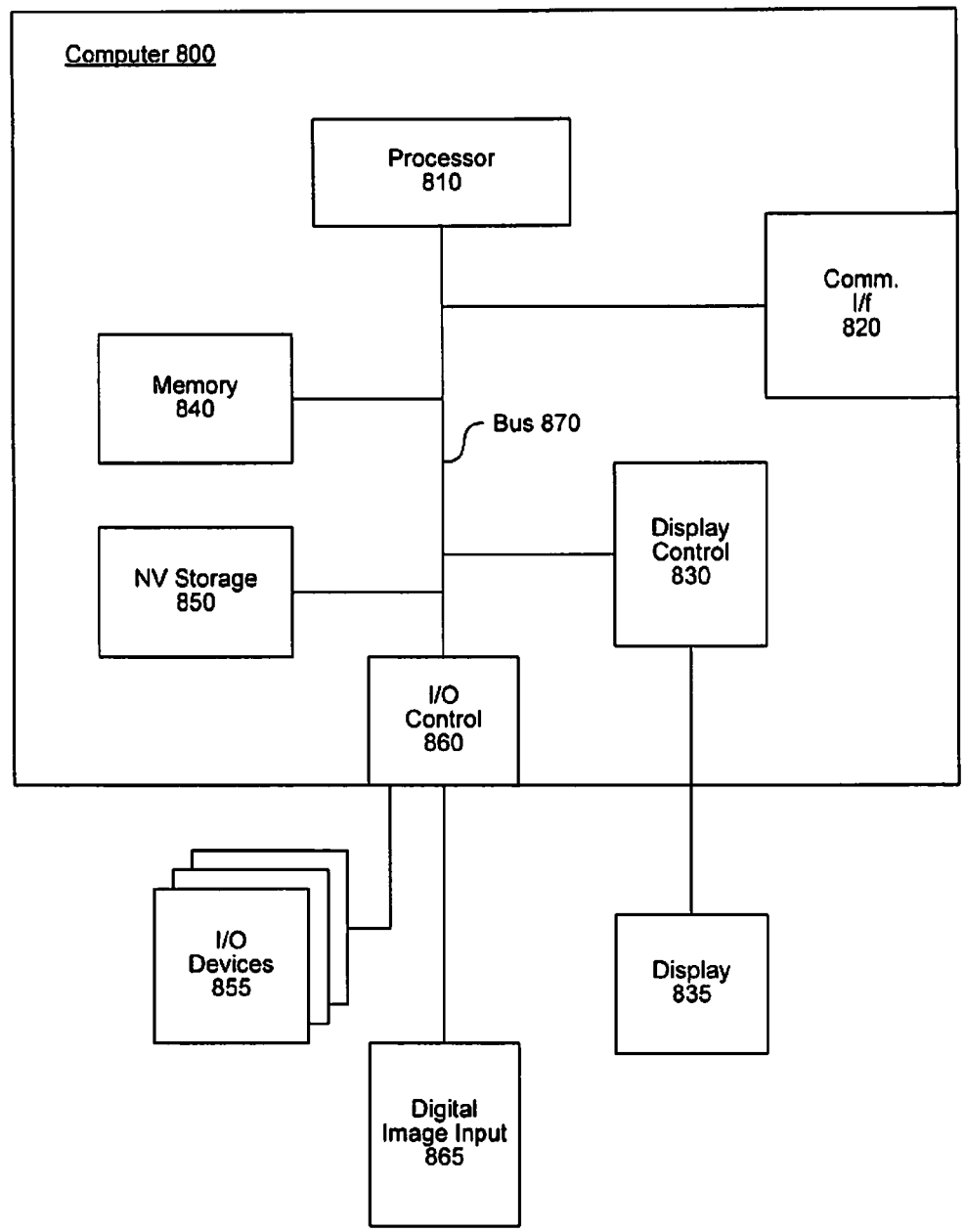
FIG. 8 illustrates an embodiment of a network which may be used with the methods described.

The following description of FIGS. 7-8 is intended to provide an overview of computer hardware and other operating components suitable for performing the methods of the invention described above, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 705 is typically provided by Internet service providers (ISP), such as the ISPs 710 and 715. Users on client systems, such as client computer systems 730, 740, 750, and 760 obtain access to the Internet through the Internet service providers, such as ISPs 710 and 715. Access to the Internet allows users of the client computer systems to exchange information, receive and send e-mails, and view documents, such as documents which have been prepared in the HTML format. These documents are often provided by web servers, such as web server 720 which is considered to be "on" the Internet. Often these web servers are provided by the ISPs, such as ISP 710, although a computer system can be set up and connected to the Internet without that system also being an ISP.

The web server 720 is typically at least one computer system which operates as a server computer system and is configured to operate with the protocols of the World Wide Web and is coupled to the Internet. Optionally, the web server 720 can be part of an ISP which provides access to the Internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides Internet connectivity to the client computer system 730 through the modem interface 735 which can be considered part of the client computer system 730. The client computer system can be a personal computer system, a network computer, a Web TV system, or other such computer system.

Similarly, the ISP 715 provides Internet connectivity for client systems 740, 750, and 760, although as shown in FIG. 7, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, ISDN modem, cable modem, satellite transmission interface (e.g. "Direct PC"), or other interfaces for coupling a computer system to other computer systems.

Client computer systems 750 and 760 are coupled to a LAN 770 through network interfaces 755 and 765, which can be Ethernet network or other network interfaces. The LAN 770 is also coupled to a gateway computer system 775 which can provide firewall and other Internet related services for the local area network. This gateway computer system 775 is coupled to the ISP 715 to provide Internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the Internet through the gateway system 775.

FIG. 8 shows one example of a conventional computer system that can be used as a client computer system or a server computer system or as a web server system. Such a computer system can be used to perform many of the functions of an Internet service provider, such as ISP 710. The computer system 800 interfaces to external systems through the modem or network interface 820. It will be appreciated that the modem or network interface 820 can be considered to be part of the computer system 800. This interface 820 can be an analog modem, ISDN modem, cable modem, token ring interface, satellite transmission interface (e.g. "Direct PC"), or other interfaces for coupling a computer system to other computer systems.

The computer system 800 includes a processor 810, which can be a conventional microprocessor such as an Intel Pentium microprocessor or Motorola Power PC microprocessor. Memory 840 is coupled to the processor 810 by a bus 870. Memory 840 can be dynamic random access memory (DRAM) and can also include static RAM (SRAM). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 9:
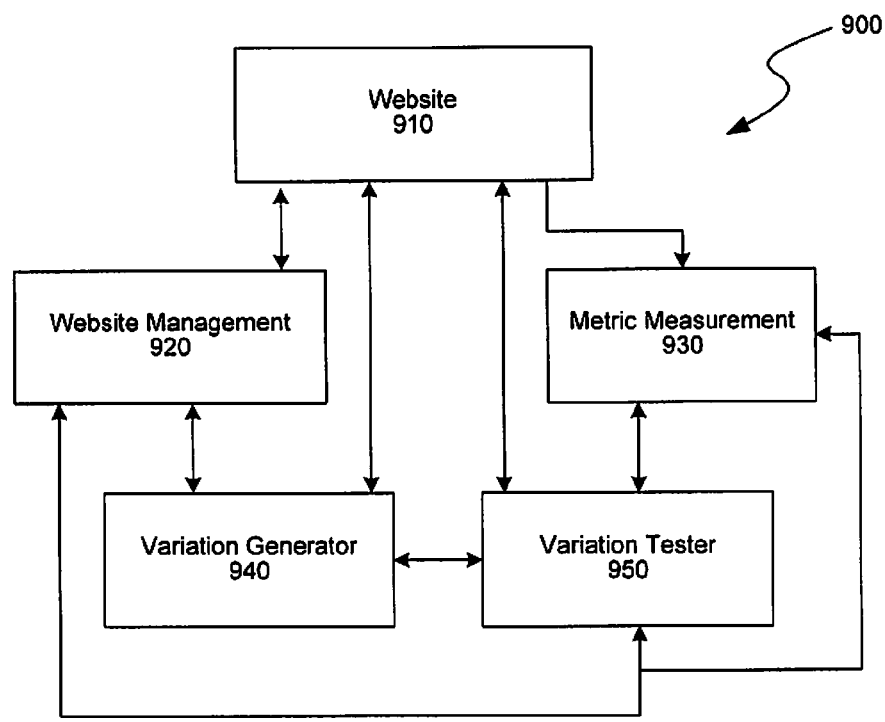
FIG. 9 illustrates an embodiment of an apparatus for operating a process.

Various apparatus may be used in conjunction with the processes described. FIG. 9 illustrates an embodiment of an apparatus for operating a process. The embodiment illustrated relates to a website, but may be adapted to other embodiments involving other types of virally marketed facilities. The embodiment illustrated includes a website manager, metric measurement, variation generator and variation tester, each of which may interact with a website in various different ways. Moreover, the various modules may be combined or subdivided in various ways consistent with the spirit and scope of the overall embodiments.

Apparatus 900, as illustrated, represents an embodiment as it may interact with a website 910. Thus, website 910 is not included in apparatus 900 as illustrated (though a website may be included in alternate embodiments). Website management module 920 is linked to website 910, and provides general management support, such as providing stored customer information from a repository, providing stored content, providing up-to-date links to dynamic content, changing subscriber or customer information, or otherwise handling back-end processing of the website. Data related to website management may be collected by website management module 920.

Metric measurement module 930 is also linked to website 910. Metric measurement module 930 measures performance of the website 910 in relation to viral marketing and growth of the website 910 (such as growth in subscriptions or revenue for example). Metric measurement module 930 thus provides an indication of whether the website 910 is growing as desired or expected. Moreover, metric measurement module 930 may trigger a cycle of changes in the website 910.

Variation generator 940 is also linked to website 910 and website management 920. Generator 940 may receive data from website 910 directly and/or from website management module 920. Such data may relate to usage of portions of website 910 and may also include feedback from customers and an indication of how customers are coming to website 910 (such as by referral, through advertising, search engine, or another method for example). Generator 940 may then mine this data to determine potential areas for improvement of website 910, and generate potential changes or variations based on this data. In some embodiments, generator 940 operates to constantly determine potential variations, whereas in other embodiments, generator 940 operates in response to a trigger signal from metric measurement module 930. Such a trigger may be transmitted through website management module 910, or transmitted directly for example.

Variation tester 950 is linked to website 910, generator 940 and metric measurement module 930. Tester 950 may use variations from generator 940 responsive to a signal from measurement module 930 and may thus concurrently test the variations on the website 910. Results from the acts of tester 950 may determine which variations should be implemented and which should be discarded or held until later implementation. Tester 950 may gather data indicating the effectiveness of variations, or it may simply implement the variations, with metric measurement module 930 gathering the relevant data. Note that an example of two combined modules may involve a combination of management module 920 and metric measurement module 930 as a single module, for example.

Figure 10:
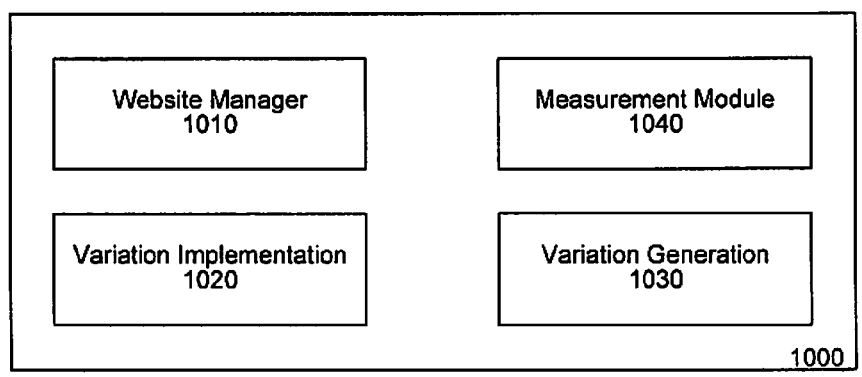
FIG. 10 illustrates a medium embodying instructions for causing a processor to execute the methods of operating a process.

FIG. 10 illustrates a medium embodying instructions for causing a processor to execute the methods of operating a process. A medium may be a single piece of media or a collection of media, without materially changing the medium. Typically, the medium will be machine-readable.

Medium 1000 includes a website manager 1010, measurement module 1040, variation generator 1030, and variation implementer 1020. Website manager 1010 manages a website (not shown), providing general management support, such as accessing stored customer information from a repository, supplying stored content, supplying up-to-date links to dynamic content, modifying subscriber or customer information, or otherwise handling back-end processing of the website. In some embodiments, data related to website management may be collected by website manager 920.

Measurement module 1040 is also linked to the website. Measurement module 1040 measures performance of the website in relation to viral marketing and growth of the website. Measurement module 1040 thus provides an indication of whether the website is growing as desired or expected. Also, measurement module 1040 may trigger a cycle of changes in the website, such as testing of variations of the website for example.

Variation generator 1030 is linked to the website. Variation generator 1030 may receive data from the website directly and/or from website manager 1010. Such data may relate to usage of parts of the website, an indication of how customers are coming to the website (such as by referral, through advertising, search engine, or another method for example), and an indication of customer/user feedback.

Variation generator 1030 may mine this data to determine potential areas for improvement of the website, and accordingly generate potential changes or variations to the website. In some embodiments, variation generator 1030 operates in response to a trigger signal from measurement module 1040, whereas in other embodiments, variation generator 1030 operates to constantly determine potential variations. A trigger may be transmitted through website management module 1010, or transmitted directly for example.

Variation tester 1020 tests variations from variation generator 1030 on the website. Variation tester 1020 may use variations from variation generator 1030 responsive to a signal from measurement module 1040 and may thus concurrently test the variations on the website. Results from the acts of variation tester 1020 may determine which variations should be discarded and which should be implemented. Variation tester 1020 may gather data relating to effectiveness of variations, or it may simply implement the variations, with measurement module 1040 gathering the relevant data.

While specific embodiments have been described, other methods and apparatuses for enhancing virality may be used as well. The following appendices provide further details of various embodiments. These embodiments share some features with embodiments described above, and provide other features not previously described.

APPENDIX A

A Mathematical Treatment of Enhancing Viral Growth

The intuitive concept of viral growth in a consumer service product is that by interacting with the product in a natural way, each user brings more than one additional user to the product. In this appendix, mathematical techniques that may be used to understand, predict, and ultimately improve the virality spread of a wide range of amenable products are described.

First basic notation is provided. The rate of acquiring new users will be denoted by x(t). If there is long-term recurring revenue, the total user base u(t)=∫x(t)dt may be of substantial importance, but regardless, viral sites are about growth: x(t) is the quantity of primary interest.

Relationships between individuals may be understood by using the nomenclature of the family tree. When one individual induces another to use the product, the former is referred to as the parent, and the latter as the child. Should the child subsequently induce another individual to register, then in the context of that relationship she becomes the parent, and this newest user is the child.

Furthermore, a steady-state assumption is made, so that the behavior of a user is independent of the date of registration, or any of the parent's statistics. This assumption is easy to attack. On short timescales, user behavior will vary with the day of the week, and in response to seasonal events such as holidays. On longer timescales user behavior is expected to change as the product becomes more well-known, as the offering is changed, as competitors enter the market, or as the market becomes saturated. Finally, one would not be surprised to find couplings in the behavior of users who are closely related.

However, the steady-state assumption is very good for the purposes of intermediate-term modeling of viral growth. As described below, the short-term periodic weekly variations can be accounted for in a straightforward manner that is consistent with the development given here. The cases studied show little coupling in the viral aspects of the behavior of closely related users. In the case where long-term trends are evident, these may be incorporated into a model quite easily, though in the cases studied such fluctuations have been unsystematic and difficult to foresee. However, it is the intermediate term which is often of greatest importance for managing a business. For that perspective, the models based on the steady-state assumption have proven to be very meaningful.

Given the steady-state assumption, the registration rate grows as a simple exponential, which we write as $$x(t) = x_0 e^{\alpha t}$$

One useful metric of virality is a measure of how many descendant users each user produces, on average, after a given time t.

The time development of virality is denoted as v(t)

Virality typically increases monotonically. Also, one may assume that on average virality grows asymptotically toward a constant, such that $$\lim_{t \to \infty} v(t) = \text{const}$$

It may be useful to relate α, the rate of viral growth, to the time development of the virality. The time-derivative of the virality function, v'(t), describes the average rate at which a parent will generate children. Thus the future growth is determined by the convolution of all previous growth with v'(t). This may be considered the steady-state virality assumption, and may be formulated as $$x(t) = \int_0^t v'(\tau) x(t-\tau) d\tau$$

Using this relation, one can solve for the time constant of viral growth in terms of the virality, which may be measured empirically. Substitution gives $$x_0 e^{\alpha t} = \int_0^t v'(\tau) x_0 e^{\alpha(t-\tau)} d\tau$$

So, $$1 = \int_0^t v'(\tau) e^{-\alpha \tau} d\tau$$

Since $$\lim_{t \to \infty} v'(t) = 0,$$

one may take the liberty of extending this integral to infinite bounds as $$1 = \int_0^t v'(\tau) e^{-\alpha \tau} d\tau$$

This is may be considered the Fundamental Viral Relation. Future growth in new users is exponential, and its time constant α may be solved numerically given a measurement of v(t). In practice, availability of data may set the upper limit of the integral.

The real world runs on various interlinked periodic schedules, of which the day, the week, and the year are of importance for modeling consumer businesses. In reality, x'(t) is not an exponential, but may vary with the hours of the day and the days of the week. In the long-run, however, constant viral growth must take an exponential form. That means that if one discretizes growth on a scale large enough to average-out fluctuations, the discrete quantity will take the form $$x_n = x_0 e^{\alpha n}$$

This discretized expression is believed to be exact, not an approximation of the continuous case. The week is a good timescale to work with, as there are substantial fluctuations between days within it. So many external factors change over the course of a year that this scale is not practical. One particularly useful way to look at things is to use a weekly discretization, but compute overlapping models based on each possible starting day (such as a seven-day moving average). This removes fluctuations within the week while providing daily update resolution.

The steady-state assumption is empirically valid for weekly discretizations. It is also valid in models with a distinct daily discretization of v(t) for each day of the week.

As this approach uses discrete models to look at viral growth, it is straightforward to cast the fundamental viral relation in a discrete form. One must then predict the future v'(t) for users registered in the present.

Stationarity is useful here. A potentially useful way to do this is to estimate v'(t) for a given day as the number of new users whose parent registered t days previously divided by the total number of new users on that day t days previously. This calculation may be done equally well in terms of weeks rather than days, and in fact this measure is potentially more useful since it removes intra-week fluctuations. The discretized measure of virality may be known as the Virality Vector.

Having measured virality, most directly by computing the viral timescale α, another goal is to improve it. Improving virality proceeds through an iterative optimization process. One may measure the effects of product changes and variations on a using concurrent tests in which groups of users are simultaneously exposed to different versions of the product. Ultimately, one seeks to maximize the rate of growth α.

While the true form of the virality v(t) can be measured empirically, it derives from the intricacies of user behavior, and so is not given by simple analytical expressions. Nonetheless, approximating it as such can be very helpful in understanding viral product dynamics.

In practice, one may find that the virality vector is quite well approximated by $$v'(t) = ae^{-t/b} + c$$

Figure 11:
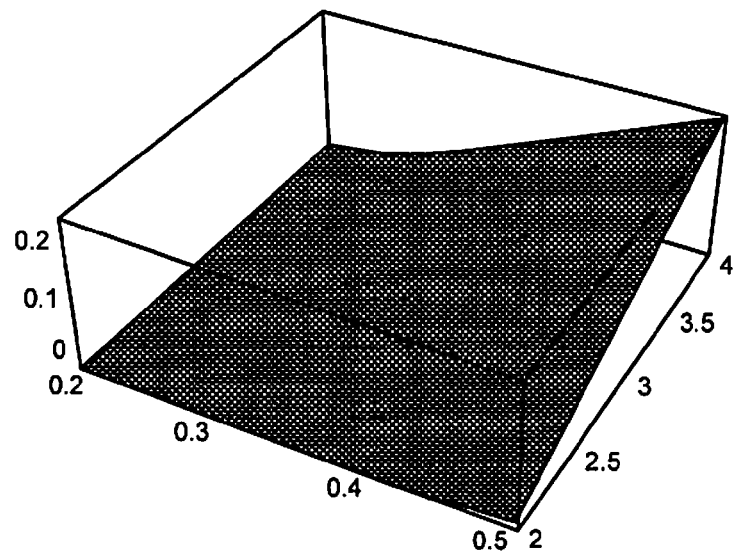
FIG. 11 illustrates a plot of virality parameters in three dimensions.

In this case the fundamental viral relation may be solved exactly. The solution can be illuminating in that it shows how for c>0, a history of active use can provide a cushion that sustains future growth even when one might expect exponential decline on the basis of short-term statistics. In particular consider the solution $$\alpha \to -\frac{1 - ab - bc - \sqrt{4bc + (-1 + ab + bc)^2}}{2b}$$

when graphed, one sees a plateau for small a and b, rather than a plunge into negative growth FIG. 11 illustrates this plot, using Mathematica software with a request of $$Plot3D\left[-\frac{1 - ab - bc - \sqrt{4bc + (-1 + ab + bc)^2}}{2b}\Big/c \to 0.001, \right.$$
$$\left. (a, 0.20, 0, 5\}, \{b, 2.0, 4.0\}\right]$$

If the emphasis is on increasing growth, the c term may safely be neglected. In this case the solution for a becomes even simpler $$a = a - 1/b$$

This expression is unforgiving, permitting exponential decline as well as growth.

Figure 12:
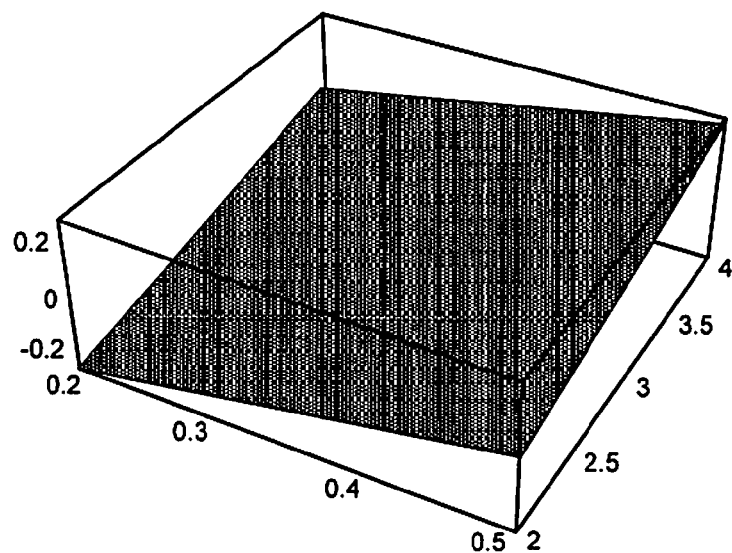
FIG. 12 illustrates another plot of virality parameters in three dimensions.

FIG. 12 illustrates this plot, using Mathematica software with a request of Plot3D[a−1/b, {a, 0.2, 0.5}, {b, 2.0, 4.0}]

It may also be useful to plot the time-trajectory of the virality on this surface.

Because the parameters a and 1/b relate so naturally to the viral timescale α, it makes sense to estimate these values from the virality vector and to isolate each one for improvement. Viral growth is given most directly by its rate, denoted by the single parameter α. However, a may not be measured directly. Rather it is calculated from the virality vector v'(t), which is more straightforward to measure, but difficult to optimize on account of its vector nature. The parameters provide a more intuitive goal or set of goals for viral optimization.

In many cases, it helps to break down the viral cycle in a number of linked steps, each of which may be optimized individually. This breakdown is product specific, so one may take a viral web site that spreads through e-mail as an example.

In this case, users receive an invitation e-mail requesting them to respond to the site and register. Once registered users are encouraged to refer others to the site, generating an e-mail and completing the viral loop. In the first step, one has a response rate to the e-mail. In fact, the cumulative response rate is a function of time, x(t), which increases monotonically as more individuals respond. Like v(t), x(t) may also be approximated in order to give it more intuitive meaning.

For example, one might write $$x'(t) = a_x e^{-t/b_x}$$

In this example, the average number of invitation e-mails generated by a user is denoted as y(t). Similarly, one may make an analytical approximation $$y'(t) = a_y e^{t/b_y}$$

The parameters x, y, and their decompositions to subparameter vectors $[a_x, b_x]$, $[a_y, b_y]$ provide a more direct way of optimizing for viral growth. For example a small change in the content of the web site that gets users more engaged might be expected to make a great impact on the number of invitations sent, but have little impact on the response rate.

Since $[a_y, b_y]$ can be measured more easily and with less error than [a, b], one can optimize on these subparameters and expect to achieve improvement in viral growth.

The discussion above describes the core mathematical concepts underlying an approach to virality. Practical application of these ideas to drive users to the product typically involves a continued dedication to an iterative cycle of testing and improvement.

The assumptions that go into this understanding of viral growth should be checked for each new business implementation. Moreover, the steady-state assumption must hold on the timescale of the discretization. Where the virality or its component steps are parameterized, care must be taken to ensure that the analytic form corresponds well with measurement.

The parameters a and 1/b both serve as guides, and in some cases the one can be measured more readily than the other. Similar subparameters may be computed for steps in the viral process to aid in evaluating test performance. Ultimately, the object of viral optimization is the exponential growth rate α.

APPENDIX B

An Extended Complementary Approach

Viral optimization is potentially applicable to any product through whose use one individual might encourage another new person to become a user. The particular example of this section is in the area of online consumer websites, but one might apply these techniques to applications both online and offline, and where the customers are either individuals or businesses.

When one user creates more than one additional user by interacting with the product, then both the total user base and the rate at which new users are acquired grow exponentially, with daily registrations taking the approximate form of $e^{\alpha t}$. In this embodiment, it is merely important to realize that the single parameter of greatest interest is the rate of viral growth α.

Viral growth is extremely powerful when it works. Product ideas that appear to be naturally viral often can get quite close to true viral growth on a first attempt. Preferably, one subsequently modifies and improves the product in order to achieve viral growth. Viral optimization is a process for getting from a good idea and an intelligent first-implementation of the product to sustained viral growth and millions of users. One approach combines a heavy dose of both left- and right-brain activity in an optimization cycle. The optimization process begins with numbers. In addition to the viral growth rate $\alpha$, one may also measure a number of "subparameters" that describe how different parts of the user product contribute to the overall growth. Once the initial numbers are obtained, test improvements are then developed. Often, a look at the numbers, combined with a careful examination of the product will immediately suggest changes. However, imagination and creativity can help tremendously at this stage. Alternatively, a menu of standard improvements may also be applied in an essentially mechanical manner.

When developing a viral product it is often important to let the numbers inform product decision making. Rater than choosing to implement the improvement that seems best on the basis of ones intuition, one should implement a variety of similar but incompatible test improvements as different versions of the product. Numerous test versions can be put online simultaneously, each being experienced by a different group of randomly assigned users. One subsequently measures viral growth and viral subparameters of each version. Winners are selected and appraised for their merits and losers scrutinized for their faults. The cycle of optimization may then be repeated by making variations to the best performing versions, taking into account the lessons of previous tests. Such lessons may be stored in a database allowing for automatic access and interpretation.

In the following paragraphs, details behind viral optimization are further illuminated. The viral loop can generally be broken down into a number of modules. Starting from an invitation e-mail one measures the probability with which a user responds to the site to register. In some cases, the registration process involves multiple steps, all of which must be completed before the user is ready to invite others. Once a user completes the registration, one measures the number of invitation e-mails generated to others who are not registered. In some cases, one may track attempts to connect with previously registered users, but these will not lead to growth. Principal subparameters of the viral process are listed below.

| Name | Description - Average of |
|---|---|
| x | Conversion from invite to registration |
| $\tau_x$ | time to respond to an invite |
| y | number of invites sent by registered user |
| $\tau_y$ | time to generate an invite |
| v | number of children per parent |
| $\tau_v$ | time to create a child user |
| Other | Conversion from e-mail to site |
| | Conversion from site visit to registration |

All of the viral subparameters may be considered as functions of time, and in the limit of long times. For example, an invite often sits in a recipient's mailbox for several hours before it is read. Thus, the response rate, x, rises over the course of hours and days. However, after about a week, the response rate stabilizes as the majority of people have seen the invite and chosen whether or not to respond. This limit provides a scalar formulation of x.

All of the viral subparameters and the virality itself can be calculated as functions of time. When looking back at collected data, one takes a beginning date and an ending date. For example, for x, one can divide the number of responses to invitations sent on the beginning day which generated a registration by the ending day by the total number of invitations sent on the beginning day. This gives the time development of x for the beginning day. Note that a discretization interval of one day may just as well be replaced with one hour or one week.

It may also be useful to bin the data to account for intra-week fluctuations. Rather than considering a beginning day and an ending day, one considers a reference day and interval of days. This interval is analogous to the number of days between the beginning day and the ending day described previously. For x, divide the number of responses to invitations sent in the week prior to the reference day that generated a registration within a number of days relative to the day on which the respective invite was sent that is less than the interval by the total number of invitations sent in the week prior to the reference day. Binning may be done on any time scale, but multiples of weeks are most useful as they smooth out the most significant periodic fluctuations.

Figure 13:
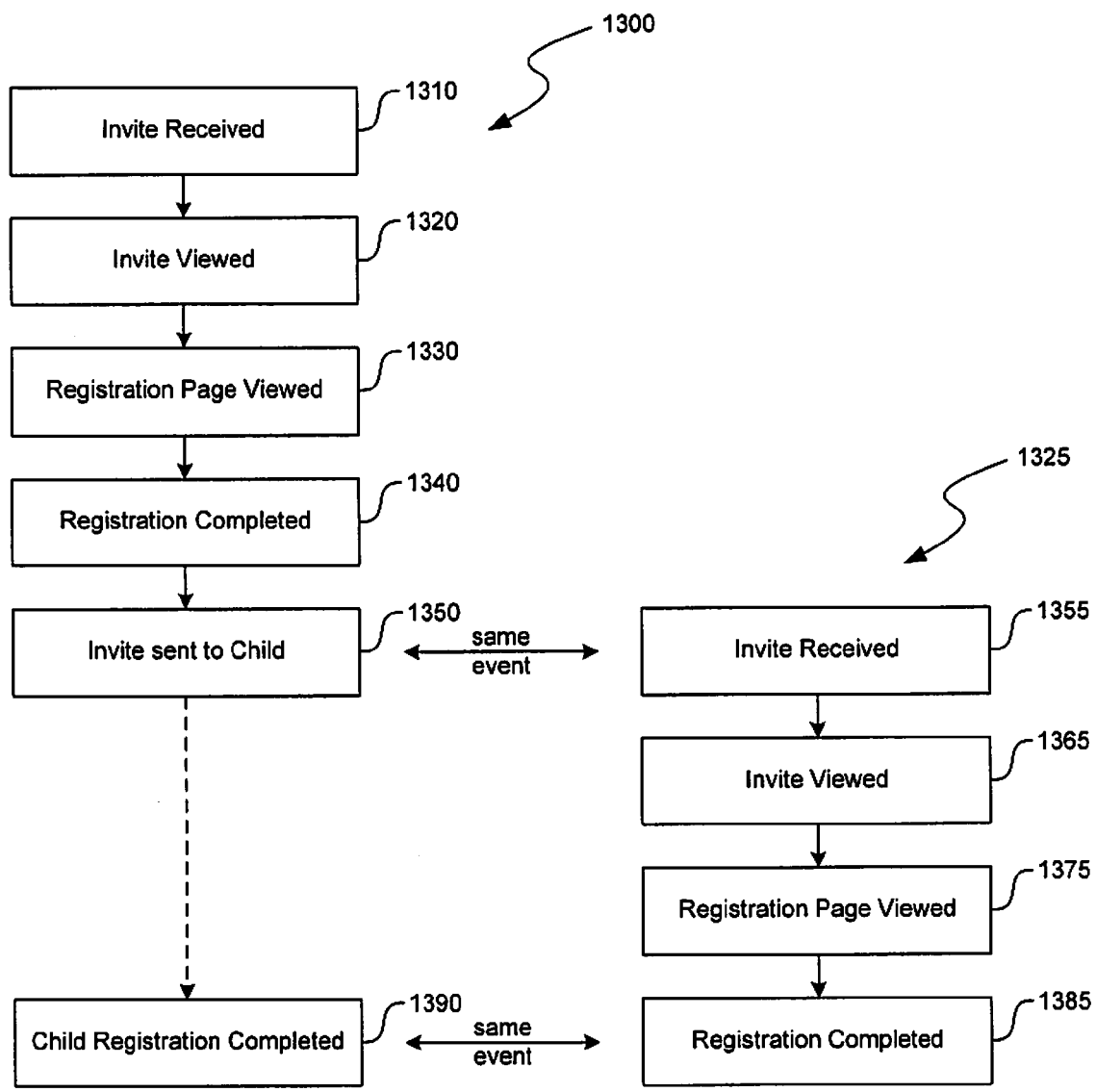
FIG. 13 illustrates a process of distributing invitations for a viral facility.

This calculation may be generalized using the notion of events. For x, the beginning event is when the child receives the invite, and the ending event is when the child completes the registration. One can break down the viral process into a number of events, assigning descriptive group identifications to each as they relate to particular users. FIG. 13 illustrates the events in a simple viral process with a single loop.

FIG. 13 illustrates a process 1300 occurring for a parent and a process 1325 occurring for a child. Process 1300 relates to a parent receiving an invite and registering with a viral facility. At module 1310, a parent receives an invite. At module 1320, the parent views the invite. At module 1330, the parent views a registration page. At module 1340, parent registration is completed. At module 1350, an invite is sent to a child responsive to the parent registration. For example, a parent may supply contact information for a potential child member as part of the registration process or at a time thereafter.

Process 1325 relates to a child receiving an invite as a result of parent registration of process 1300, and registering with the viral facility. Responsive to module 1350, at module 1355 a child receives an invite to a viral facility. At module 1365, the invite of module 1355 is viewed. At module 1375, a corresponding registration page is viewed. At module 1385, child registration is completed and the child is enrolled in the viral facility. Correspondingly at module 1390, registration of the child is reflected with respect to the parent in process 1390.

Accordingly, a parent may be enrolled as a member or user in a viral facility. Following that, the parent may provide contact information for potential additional members (child members). Next, the potential child member(s) are sent invitations, and the potential child member(s) may enroll in the viral facility.

The process described for computing x may be used to compute the other subparameters, merely by replacing the numerator and denominator of the conversion with the respective events. Some calculations are listed below:

| Subparameter | Numerator | Denominator |
| --- | --- | --- |
| X | Registration completed | Invite received |
| e-mail open rate | Invite viewed | Invite received |
| e-mail clickthru | Registration page viewed | Invite viewed |
| registration conversion | Registration completed | Registration page viewed |
| Y | Invite sent to child | Registration completed |
| v: reg. to reg. | Child registration completed | Registration completed |
| v: invite to invite | Invite sent to child | Invite received |

(The assumption of notation is made that all invites sent are received. Invites that are not received, due to email reliability problems for example, are factored into the response rate.)

Timescales of subparameters (e.g., $\tau_x$) may be computed by weighting each term in the numerator by the time difference between beginning and ending events. Timescales are potentially important since a viral loop composed of chained steps with subparameters $\{q_i, \tau_{q,i}\}$ typically has an exponential growth rate approximated by $((\Pi q_i)-1)/(\Sigma \tau_{q,i})$.

The method described for computing the time dependence of subparameters is forward-looking, in that when one calculates statistics with reference to the beginning day, one must wait until the ending day in order to make the measurement. This may be called a begin-referenced conversion. Another useful way to compute conversions is to reference the time-development of a variable to the ending day. In the simple single-day reference model this merely constitutes a reassignment of the reference day from beginning day to ending day. For the binned computation, one weights the average of the begin-referenced conversions for intervals ending in the week prior to the reference day by the denominator of that conversion. The binned end-referenced conversion may also be computed directly by algebraic transformations of this computation.

Another potentially useful transformation is to compute derivatives of begin-referenced and end-referenced conversions with respect to the interval. This is done by assigning the difference between the $i^{th}$ interval and it $i+1^{th}$ interval to the $i^{th}$ differential conversion. One can also compute a differential binned end-referenced conversion by weighting the average of the differential begin-referenced conversions for intervals ending in the week prior to the reference day by the denominator of that conversion in the original begin-referenced conversion. A form of the cumulative end-referenced conversion may then be recovered by assigning the sum of the $1^{st}$ interval through the $i^{th}$ interval to the $i^{th}$ interval of the differential computation of the cumulative end-referenced conversion. Algebraic manipulations give alternate steps for computing this quantity.

In another form of these computations, the basis discretization interval of one day is replaced with a basic discretization interval of one week.

End-referenced versions can be useful predictors of future performance when stationarity holds. This appears to be generally true of the binned conversion that smoothes out short-term periodicity. Potentially, the differential computation of the cumulative end-referenced conversion provides the greatest predictive power.

The viral timescale can be computed by numerically solving the fundamental viral relation. For v'(t), one takes the differential end-referenced conversion from parent registration to child registration with a basis of one week. While this measure has been found to be most meaningful in some embodiments, one can also use the differential end-referenced conversion from parent to child with a basis of one day and a binning of one week, or the differential end-referenced conversion from parent to child with a basis of one day and no binning.

The central reason for studying and analyzing virality is predicting the future course of registrations, and thus business growth. The exponential rate of viral growth, $\alpha$, is potentially useful in that it gives a useful steady-state picture, but growth becomes more complicated when other marketing efforts inject more users into the viral loop. One can predict future registrations using an autoregressive model with defined injections. That is, suppose there are $r_i$ registrations on the $i^{th}$ day, and suppose that days 1, ..., n have elapsed, so that days n+1, ... denote the future. If we assume that mechanisms outside the viral loop inject $q_i$ users on the $i^{th}$ day, for i>n, then we may predict future registrations as $r_i = (S\ r_{i-j} \times v'_j) + q_i$, where the sum is taken for j=1, ..., as far as data is available and i>n.

This model makes several assumptions. For one, all generations are assumed to be the same. This should be checked by computing the virality vector v'(t) for child users as a function of the number of generations separating them from a "seed" user, one who was introduced from outside the viral loop. Another assumption which must be checked is that there are no correlations between the virality vectors of parent and child. If either of these correlations are found, corresponding adjustments may be introduced into the model.

Additional modeling may identify slow long-term trends in the virality vector. For example, word-of-mouth may drive brand recognition to increase conversion of an e-mail invite. Another trend might be saturation, in which fewer new people are invited because many have already registered. Such trends may be identified by regression analysis or related time series analysis techniques, and the findings incorporated into the model outlined above.

Systematic improvement of virality involves, in some embodiments, measuring the effect of various changes to the product on the viral timescale and on the viral subparameters. However, sequential tests are complicated by nuisance variables, such as the day of the week, or the particular part of the country that the web site is hot in, which introduce uncertainty into comparisons. Whenever possible, it is desirable to run multiple versions of the web site concurrently, such that the same nuisance variables enter all test versions.

One may consider the case of e-mail invite copy in detail. A set of tests might consist of several subject lines, background colors, and sales pitches. For example, if there are four different versions within each test, then there are a total of 64 (i.e., 4×4×4) possible versions. It is possible to generate all possible combinations automatically, and to assign each user to a category using a random number generator or a hash function.

After collecting data, one may compute the begin-referenced viral subparameters for each test category. The subparameter most directly affected by the e-mail tests is x, the conversion from invite to registration, but a user's experience during the process of being invited might influence her likelihood to invite others. Thus, the subparameter v should be scrutinized as well, and may provide the final figure of merit for a particular version.

A key consideration in designing tests is the availability of data. It is potentially important to compute standard errors for the conversions. It is standard statistical knowledge that the variance of an estimated mean $<x>$ is estimated as $(<x^2> - <x>^2)/N$, where N is the number of data points. While there is no general rule for how much data must be acquired to give statistically significant results, previous experience with the site can serve as a guide. In general, one will get statistically significant results more quickly by dividing the users among fewer tests. A variety of significance tests may be applied to guide final decision making. Standard statistical methods include the t-test, the F test, Scheffé's method, the Tukey method, Duncan's multiple range test, and the Newman-Keuls test among others.

It is important to always keep in mind that there may be correlations between individual test items, for example, one e-mail body may perform better with a particular subject line. Such correlations also can cross elements being tested. For example, a registration page may perform better when paired with an invite with the same color background. When enough data is available, it may be worthwhile to undertake an analysis of covariance between different items being tested. When the ability to collect data is limited, one may make the (perhaps hopeful) assumption that any correlation effects are small. However, there is no a priori reason to believe that this will be the case. If a measure of covariance indicates that there is a correlation in effect between the elements being tested, it may make sense to apply factor analysis within the concurrent testing paradigm to design and execute an efficient optimization strategy.

APPENDIX C

An Exemplary Event Architecture

The following is an exemplary embodiment of data structures which may be used to measure virality in conjunction with tests of a website or other potentially viral facility.

Concurrent testing is the primary mechanism for improving viral web sites in this embodiment. The event architecture described presents a uniform standard for recording information relevant to concurrent tests. A shared analysis backend then provides the tools for displaying test results and for informing decisions.

The following tables may be provided, such as in a single tar file. In one embodiment, all of the tables provided to the shared analysis backend will clear any data previously existing in those tables. In such an embodiment, stored results need not be cleared automatically.

| Source Data Table Descriptions Test description table: test_desc |
|---|
| Table test_desc<br>   testid INT A                 /* unique test identifier */<br>   description VARCHAR(255)     /* Text description of test */ |

The test_desc table gives a plain-text description of each test.

| Test category description table: test_cat_desc |
|---|
| Table test_cat_desc<br>   testid INT                 /* The test in question */<br>   testcategory INT       /* A category identifier, unique within each test */<br>   description VARCHAR(255)     /* Text description of test category */ |

The test_cat_desc table gives a plain-text description of each category for within each of the tests.

| Web site step group description table: group_desc |
|---|
| Table group_desc<br>   eventgroup INT           /* A unique process step (group) identifier */<br>   description VARCHAR(255)     /* Text description of step */ |

The group_desc table relates the eventgroup identifier to a plain-text description of the part of the process that this identifier refers to (e.g., viewed invite, registered, etc.)

| Computation instruction table: conversion_compute |
|---|
| Table conversion_compute<br>   testid INT        /* Identifier of test for which to compute conversion */<br>   conversion VARCHAR(255)     /* Eventgroups to compare in form denominator:numerator */<br>   comptype INT           /* Reserved */<br>   description VARCHAR(255)     /* Text description of step */ |

The conversion_compute table gives a list of computations to be made. The dependent eventgroup is represented by numgroup and the independent eventgroup is represented by denomgroup. The ratio of the two is computed.

| Event data table: events |
|---|
| Table events<br>   eventid INT           /* A unique event identifier */<br>   dateref DATE         /* Timestamp for the event */ |

The events table associates discrete events with a date and time. For the purposes of different tests each event may be associated with any number of users and processes.

| Event assignment data table: event_test_ref |
|---|
| Table event_test_ref<br>   eventid INT         /* Reference to specific event */<br>   userid INT   /* Unique identifier relating event to a particular individual */<br>   eventgroup INT       /* Eventgroup in the context of user identified by userid */<br>   testid INT            /* Identifier of relevant test */<br>   testcategory INT       /* Category assignment within referenced test */ |

The event_test_ref describes how events relate to particular tests. The userid is sometimes used for grouping responses.

A Simple Example

A sample implementation is provided in order to demonstrate the data format. Suppose only one test, the invite test is used. Then there is only one row in the test description table.

| Contents of file test_desc.csv as (testid, description) |
|---|
| 1, Invite Test - January |

The test categories refer to different variations of the test. In this case, there are four design versions.

| Contents of file test_cat_desc.csv |
|---|
| as (testid, testcategory, descriptions) |
| 1, 1, iBook Girl design |
| 1, 2, Beach design - white text |
| 1, 3, Laughing People design |
| 1, 4, Beach design - black text |

Before building the event table, we have to assign group id numbers to the different steps in the viral process.

| Contents of file group_desc.csv |
|---|
| as (eventgroup, description) |
| 1, User sent invite |
| 2, User received invite |
| 3, User completed registration |
| 4, User's child completed registration |

It is assumed that a good pseudorandom algorithm or hash function has been used to assign each user to a test category which specifies which sort of invite e-mail they are to receive. If users are not exposed to the test (i.e., they do not receive an invite during the duration of the test), then they are not assigned a category and are excluded from the analysis.

Whenever an invite goes out, the web site must generate one event and two references to that same event. These both go into event_test_ref with the following forms:
For the person sending the invitation:

| | |
|---|---|
| eventid: | /* identification number of the invitation event */ |
| userid: | /* inviting user's userid */ |
| eventgroup: | /* 1 */ |
| testid: | /* 1 */ |
| testcategory: | /* type of e-mail parent received when invited. */ |

One must not generate the event reference if the parent never received an invitation, or if the parent received an invitation in the context of a previous test.
For the person receiving the invitation:

| | |
|---|---|
| eventid: | /* identification number of the invitation event */ |
| userid: | /* userid of person receiving the invitation */ |
| eventgroup: | /* 2 */ |
| testid: | /* 1 */ |
| testcategory: | /* type of e-mail that child is about to receive. */ |

Whenever a user completes the registration process the web site generate one event and up to two references as follows:
For the person registering:

| | |
|---|---|
| eventid: | /* identification number of the registration event */ |
| userid: | /* userid of person registering */ |
| eventgroup: | /* 3 */ |
| testid: | /* 1 */ |
| testcategory: | /* type of e-mail invite that this user is responding to. */ |

Again, it does not generate the event reference if the person registering never received an invitation in the context of the present test.

For the parent of the person registering:

| | |
|---|---|
| eventid: | /* identification number of the registration event */ |
| userid: | /* userid of parent of registering child */ |
| eventgroup: | /* 4 */ |
| testid: | /* 1 */ |
| testcategory: | /* type of e-mail that the parent received when invited. */ |

Again, it does generate the event reference if the parent never received an invitation, or if the parent received an invitation in the context of the present test. The tables below provide a flavor of some sample data.

| Contents of file events.csv |
|---|
| as (eventid, dateref) |
| 1, 2004-02-12 10:58:14 |
| 2, 2004-02-12 19:45:07 |
| 3, 2004-02-12 19:45:50 |
| 4, 2004-02-12 00:00:00 |
| 5, 2004-02-12 16:22:36 |
| 6, 2004-02-12 22:11:20 |
| 7, 2004-02-12 22:12:02 |
| 8, 2004-02-12 00:00:00 |
| 9, 2004-02-12 21:26:35 |
| 10, 2004-02-13 08:02:30 |
| Contents of file events_test_ref.csv |
| as (eventid, userid, eventgroup, testid, testcateogry) |
| 1, 984, 2, 1, 3 |
| 2, 985, 2, 1, 2 |
| 3, 986, 2, 1, 1 |
| 4, 984, 3, 1, 3 |
| 5, 984, 1, 1, 3 |
| 6, 984, 1, 1, 3 |
| 6, 987, 2, 1, 4 |
| 7, 984, 1, 1, 3 |
| 7, 988, 2, 1, 2 |
| 8, 986, 3, 1, 1 |
| 9, 987, 3, 1, 4 |
| 9, 984, 4, 1, 3 |
| 10, 987, 1, 1, 4 |
| 10, 989, 2, 1, 1 |

The last thing that needs to be provided is a list of the conversions that we are interested in calculating.

| Contents of file conversion_compute.csv |
|---|
| as (testid, conversion, comptype, description) |
| 1, 2:3, 0, X - Conversion from invitation to registration |
| 1, 3:1, 0, Y - Number of invites sent per registered |
| 1, 2:1, 0, V - Number of subsequent invites generated from initial invite |
| 1, 3:4, 0, V - Number of children generated by registering user. |

On the first line one measures the conversion from invite to registration by looking at a conversion on a per-user basis between eventgroups 2 and 3.

Virality Metrics Data Architecture

While the event data format often provides a very comprehensive set of information in a format that is particularly accessible for evaluating the results of concurrent tests, another format is better for making long-term projections of viral growth.

The basic inv_reg table records invites, registrations, and connections between existing users where appropriate. The table format is as below:

| Table inv_reg |
| --- |
| iid INT AUTO_INCREMENT NOT NULL PRIMARY KEY<br>/* A unique row identifier */<br>tid INT NOT NULL<br>/* Identifier representing the target (i.e., child) user id or e-mail addresses */<br>pid iNT<br>/* Identifier representing a parent registered account. (NULL when target user registers uninvited) */<br>date_inv DATETIME<br>/* Date user invited (NULL when target user registers uninvited) */<br>date_reg DATETIME<br>/* Date registered (NULL if the target user has not registered or did not register in response to the invite referenced in this row) */ |

Rows may represent any of the following:

An invitation (date_inv not null, date_reg null if unregistred, pid not null)

A registration from outside network (date_inv null, date_reg not null, pid null)

A link initiated or formed to a registered user (date_inv not null, date_reg null, pid not null)

For any given tid, there should be only one row in which date_reg is not NULL, so that the response to the invite is credited to only one parent. A consistent but arbitrary rule should be applied to the case where a user was invited multiple times before registering. Some options are to track the e-mail which was followed through to registration, crediting the first invitation, or crediting the last invitation.

When updating the inv_reg table the website application may either furnish all rows, or only those that are updated. In the latter case the iid column is used to as a unique primary key which is used to replace updated entries.

From the foregoing, it will be appreciated that specific embodiments of the invention have been described herein for purposes of illustration, but that various modifications may be made without deviating from the spirit and scope of the invention. For example, the disclosed methods and apparatuses have been described primarily in terms of use with websites, while facilities of many different forms may be managed in the same manner. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

We claim:

1. A memory having stored thereon a set of instructions which when executed causes a processor to perform a method for automatic website adjustment based on website performance determined by tracking at least one performance metric indicating a rate of viral growth that is modeled by a virality function, the method, comprising:

collecting performance data related for determining performance of a current implementation of the website, the data comprising measurement of the at least one performance metric indicating the rate of viral growth which indicates website usage;

identifying an option for improvement of the website using the performance data;

analyzing the option for improvement by implementing the option as a test variation;

adjusting the website based on the option for improvement;

determining expected usage trajectory of the website by measuring the viral growth of the website;

wherein, the virality function is modeled as having a discrete time scale; wherein, the discrete time scale is a week;

computing overlapping models to remove fluctuations within the week.

2. The memory of claim 1, wherein, the method further comprises:

generating a plurality of concurrent test variations of the website by implementing a plurality of options for improvement alongside a control version of the website using the current implementation;

selecting different groups of users to evaluate the plurality of concurrent test variations and the control version of the website;

simultaneously exposing the different groups of users to each of the plurality of concurrent test variations of the website; and identifying a best version of the plurality of concurrent test versions through determining an effect on the performance of the website.

3. The memory of claim 2, wherein, the different groups of users are randomly selected.

4. The memory of claim 2, wherein, the method further comprises, determining an effect on the rate of viral growth of the plurality of concurrent test variations of the website to identify the best version.

5. The memory of claim 1, wherein, the method further comprises, data mining the performance data to determine usage of various portions of the website, wherein, the various portions of the website relate to content or functionality.

6. The memory of claim 1, wherein, the method further comprises, data mining the performance data to analyze user feedback about the website.

7. The memory of claim 1, wherein, the method further comprises, data mining the performance data to obtain an indication of how users are coming to the website.

8. The memory of claim 1, wherein, the method further comprises, data mining the performance data to identify the option for improvement of the website.

9. The memory of claim 1, wherein, the method further comprises, measuring, one or more of, a conversion rate and a propagation rate to measure the viral growth of the website.

10. The memory of claim 1, wherein, the viral growth of the website is determined from performing convolution of previous growth of the website and a time-derivative of the virality function.

11. The memory of claim 1, wherein, the method further comprises, numerically determining the rate of the viral growth using the virality function.

12. The memory of claim 1, wherein the determining the performance of the website comprises, tracking usage of a plurality of portions of the website.

13. The memory of claim 1, wherein the determining the performance of the website comprises, evaluating public discussion of the website.

14. The memory of claim 1, wherein the determining the performance of the website comprises, monitoring commentators and/or chat rooms.

15. The memory of claim 1, wherein the at least one performance metric comprises, measuring a number of subscribers.

16. The memory of claim 1, wherein the at least one performance metric comprises, a number of subscription renewal or subscription cancellation.

17. The memory of claim 1, wherein, the at least one performance metric comprises, usage of existing users.

18. The memory of claim 1, wherein, the at least one performance metric comprises, number of invitations sent to new users.

19. The memory of claim 1, wherein, the at least one performance metric comprises, size of revenue stream.

20. The memory of claim 1, wherein, the option for improvement of the website comprises, adding content or functionality to the website.

21. The memory of claim 1, wherein, the option for improvement of the website comprises, shifting a portion of the website between a standard and a premium status.

22. The memory of claim 1, wherein, the option for improvement of the website comprises, increasing marketing outreach.

23. The memory of claim 1, wherein, the option for improvement of the website comprises, modifying site structure and accessibility.

24. A system to perform automatic website adjustment based on website performance determined by tracking a performance metric indicating a rate of viral growth that is modeled by a virality function, the system comprising:

means for, collecting performance data for determining performance of a current implementation of the website, the data comprising measurement of the performance metric indicating the rate of viral growth, the rate of viral growth taking upon an exponential form;

wherein, the rate corresponds to an exponent in the virality function that models the viral growth; the virality function is modeled as having a discrete time scale;

means for, computing overlapping models to remove fluctuations within the discrete time scale;

means for, identifying an option for improvement of the website using the performance data;

means for, analyzing the option for improvement by implementing the option as a test variation;

means for, adjusting the website based on the option for improvement, means for, determining expected usage trajectory of the website by measuring the viral growth of the website.

25. The system of claim 24, further comprising, means for, measuring, one or more of, a conversion rate and a propagation rate to measure the viral growth of the website.

26. The system of claim 24, further comprising, means for, data mining the performance data to determine usage of various portions of the website, wherein, the various portions of the website relate to content or functionality.

27. The system of claim 24, wherein, the performance data further comprises, data related to, an indication of whether a user is coming to the website through, one or more of, a referral, an advertisement, and a search engine.

28. The system of claim 24, further comprising, means for:
generating a plurality of concurrent test variations of the website by implementing a plurality of options for improvement alongside a control version of the website using the current implementation.

29. The system of claim 28, further comprising, means for:
selecting different groups of users to evaluate the plurality of concurrent test variations and the control version of the website.

30. The system of claim 29, further comprising, means for:
simultaneously exposing the different groups of users to each of the plurality of concurrent test variations of the website.

31. The system of claim 30, further comprising, means for:
identifying a best version of the plurality of concurrent test versions through determining an effect on the performance of the website.

\* \* \* \* \*